United States Patent
Xiong

(10) Patent No.: US 7,608,941 B2
(45) Date of Patent: Oct. 27, 2009

(54) ADAPTOR CIRCUIT FOR POWER SUPPLY

(75) Inventor: Jin-Liang Xiong, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/038,819

(22) Filed: Feb. 28, 2008

(65) Prior Publication Data

US 2009/0167084 A1 Jul. 2, 2009

(30) Foreign Application Priority Data

Dec. 26, 2007 (CN) .......................... 2007 1 0203420

(51) Int. Cl.
*H02J 1/00* (2006.01)
(52) U.S. Cl. .................. 307/31; 307/113; 307/115; 713/300
(58) Field of Classification Search ................. 307/72, 307/75, 85–87, 113, 115, 31; 713/1, 300
See application file for complete search history.

(56) References Cited

U.S. PATENT DOCUMENTS

| | | | |
|---|---|---|---|
| 4,730,122 A * | 3/1988 | Dreibelbis et al. | 307/75 |
| 6,498,759 B2 * | 12/2002 | Chang et al. | 365/226 |
| 7,403,050 B2 * | 7/2008 | Jiang et al. | 327/143 |
| 2002/0057019 A1 * | 5/2002 | Moran | 307/85 |
| 2005/0132236 A1 * | 6/2005 | Srinivasan et al. | 713/300 |
| 2007/0157033 A1 * | 7/2007 | Zhang | 713/300 |
| 2007/0157034 A1 * | 7/2007 | Ren et al. | 713/300 |
| 2008/0151452 A1 * | 6/2008 | Ren | 361/86 |
| 2008/0151455 A1 * | 6/2008 | Ren | 361/89 |
| 2009/0037751 A1 * | 2/2009 | Chen et al. | 713/300 |
| 2009/0055663 A1 * | 2/2009 | Chen et al. | 713/300 |

* cited by examiner

*Primary Examiner*—Fritz M Fleming
(74) *Attorney, Agent, or Firm*—Frank R. Niranjan

(57) ABSTRACT

An exemplary adaptor circuit of a power supply includes a power connector, a first electric switch, a second electric switch, and an output terminal. The power connector includes a power good pin and a power pin. The first electric switch has a first terminal connected to the power good pin of the power connector, a second terminal connected to the power pin of the power connector, and a grounded third terminal. The second electric switch has a first terminal connected to the second terminal of the first electric switch, a second terminal connected to a first voltage terminal via a first transmission line or a second voltage terminal via a second transmission line by selectively mounting a connection component to close an open segment of the corresponding transmission line, and a grounded third terminal. The output terminal outputs a driving voltage signal to chipsets on a motherboard.

10 Claims, 1 Drawing Sheet

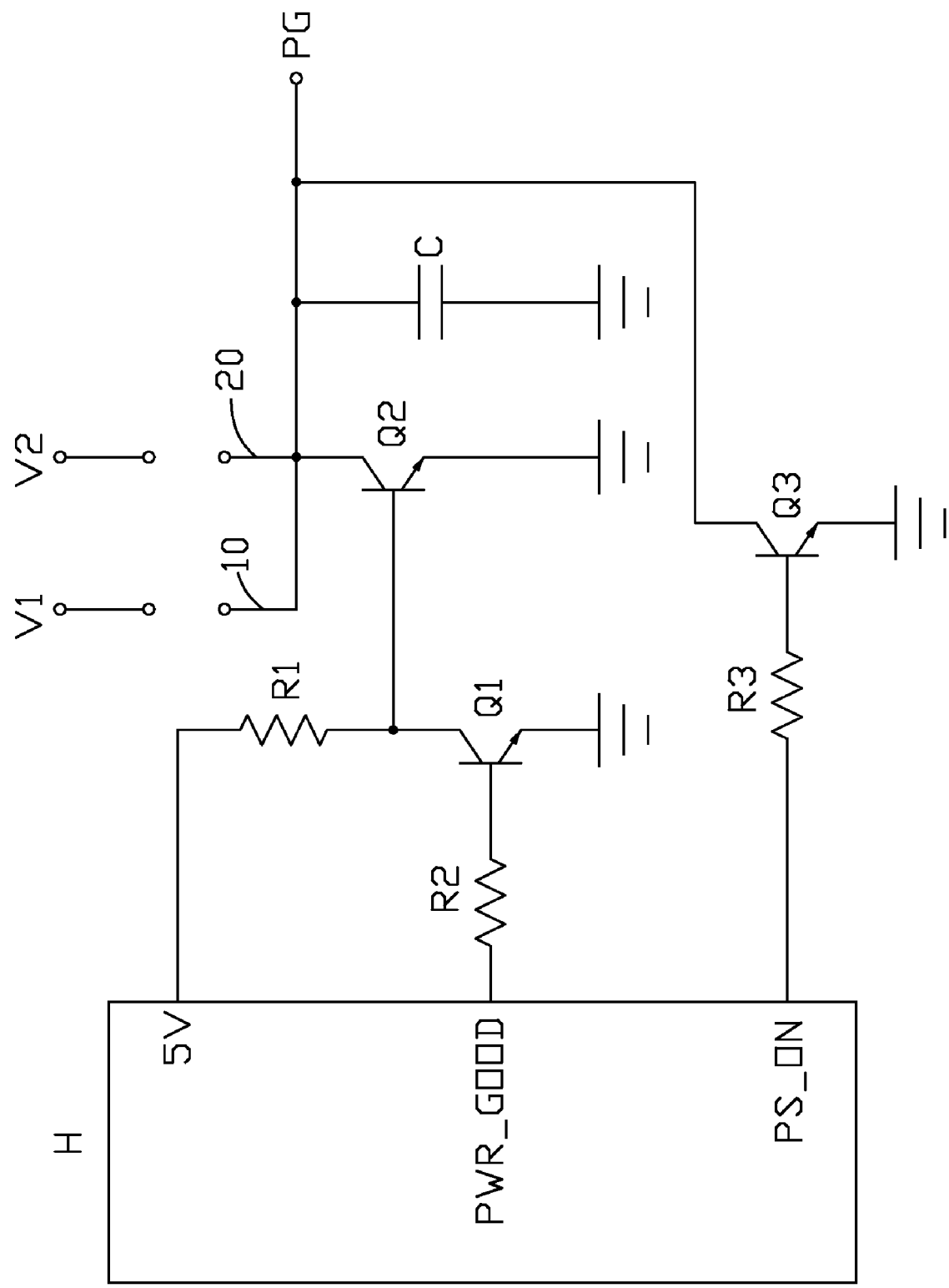

ADAPTOR CIRCUIT FOR POWER SUPPLY

BACKGROUND

1. Field of the Invention

The present invention relates to an adaptor circuit for power supply.

2. Description of Related Art

A typical microprocessor-cored computer system, such as a personal computer or a workstation computer, is turned on and off by a switch device that mechanically connects/disconnects a power supply of the computer system to/from an external power source, such as AC 110V. The power supply is connected to the external power source and transforms the external voltage into a predetermined DC level, such as +3.3V, ±5V and ±12V, and the computer system is turned on to perform various programs and functions.

As known by persons skilled with computers, mainly, power supplies are either an Advanced Technology Extended (ATX) power supply or a Balanced Technology Extended (BTX) power supply. A motherboard of a computer can be coupled to an ATX power supply via a 20-pin ATX power connector and two 4-pin ATX power connectors. The ATX power supply provides +3.3V, +/−5V, +/−12V, +5V_SB (stand by), PS_ON (power supply on) signal, and PWR_GOOD (power good) signal. When the ATX power supply is turned on, the PS_ON signal is at a low level, and the PWR_GOOD signal is at a high level but there is a delay of 100-500 ms for the other voltages. When the ATX power supply is turned off or put on standby, the PS_ON signal is at a low level, and +3.3V, +/−5V, +/−12V are turned off.

The PWR_GOOD signal is a 5V TTL (transistor-transistor logic) voltage signal for driving chipsets on a motherboard. But some of the chipsets of the motherboard need a 3.3V driving voltage, therefore the PWR_GOOD signal cannot drive these chipsets.

What is needed is an adaptor circuit for power supply which can provide both 5V and 3.3V power good signals to drive chipsets on the motherboard.

SUMMARY

An exemplary adaptor circuit of a power supply includes a power connector, a first electric switch, a second electric switch, and an output terminal. The power connector adapted for coupling to an Advanced Technology Extended (ATX) power supply includes a power good pin and a power pin. The first electric switch has a first terminal connected to the power good pin of the power connector, a second terminal connected to the power pin of the power connector via a first resistor, and a grounded third terminal. The second electric switch has a first terminal connected to the second terminal of the first electric switch, a second terminal connected to a first voltage terminal via a first transmission line or a second voltage terminal via a second transmission line by selectively mounting a connection component to close an open segment of the corresponding transmission line according to the specification of chipsets on a motherboard, and a grounded third terminal. The output terminal is connected to the second terminal of the second electric switch to provide the right voltage signal to the chipsets on the motherboard as a driving voltage signal.

Other advantages and novel features of the present invention will become more apparent from the following detailed description of preferred embodiment when taken in conjunction with the accompanying drawing, in which:

BRIEF DESCRIPTION OF THE DRAWINGS

The drawing is a circuit diagram of an adaptor circuit of a power supply in accordance with an embodiment of the present invention.

DETAILED DESCRIPTION

Referring to the drawing, an adaptor circuit of a power supply in accordance with an embodiment of the present invention includes a power connector H, a first transistor Q1, a second transistor Q2, a third transistor Q3, a first voltage terminal V1, a second voltage terminal V2, a first transmission line 10, a second transmission line 20, a connection component 30, and an output terminal PG. The power connector H includes a power supply-on pin PS_ON, a power good pin PWR_GOOD, and a 5V power pin for being coupled to an ATX power supply. The three transistors Q1~Q3 are NPN transistors functioning as three electrical switches. The first voltage terminal V1 is a 3.3V-SYS terminal of the ATX power supply, and the second voltage terminal V2 is a 5V-SYS terminal of the ATX power supply. Each transmission line 10, 20 has an open segment.

The base of the first transistor Q1 is connected to the power good pin PWR_GOOD of the power connector H via a resistor R2, the collector of the first transistor Q1 is connected to the 5V power pin of the power connector H via a resistor R1, and the emitter of the first transistor Q1 is grounded. The base of the second transistor Q2 is connected to the collector of the first transistor Q1. The collector of the second transistor Q2 is connected to the first voltage terminal V1 via the first transmission line 10 or the second voltage terminal V2 via the second transmission line 20 by selectively using the connection component 30 to close the open segment of the corresponding transmission line according to a specification of chipsets on a motherboard. The collector of the second transistor Q2 is grounded via a capacitor C, and also connected to the output terminal PG. The emitter of the second transistor Q2 is grounded. The base of the third transistor Q3 is connected to the power supply on pin PS_ON of the power connector H via a resistor R3, the collector of the third transistor Q3 is connected to the output terminal PG, and the emitter of the first transistor Q1 is grounded.

When the driving voltage of the chipsets on the motherboard should be 3.3V, the collector of the second transistor Q2 is connected to the first voltage terminal V1 via the first transmission line 10 by closing the open segment of the first transmission line 10 with the connection component 30, and leaving the second transmission line 20 open. When the computer is turned on, the power supply on pin PS_ON of the power connector H is at a low level to turn off the third transistor Q3, the power good pin PWR_GOOD of the power connector H is at a high level to turn on the first transistor Q1 via the resistor R2, so the collector of the first transistor Q1 is at a low level to turn off the second transistor Q2. At this time the output terminal PG provides the 3.3V voltage of the first voltage terminal V1 to the chipsets on a motherboard as a driving voltage signal.

When the driving voltage of the chipsets on the motherboard should be 5V, the collector of the second transistor Q2 is connected to the second voltage terminal V2 via the second transmission line 20 by closing the open segment of the second transmission line 20 with the connection component 30, and leaving the first transmission line 10 open. When the computer is turned on, the power supply on pin PS_ON of the power connector H is at a low level to turn off the third transistor Q3, the power good pin PWR_GOOD of the power connector H is at a high level to turn on the first transistor Q1 via the resistor R2, so the collector of the first transistor Q1 is at a low level to turn off the second transistor Q2. At this time the output terminal PG provides the 5V voltage of the second voltage terminal V2 to the chipsets on the motherboard as the driving voltage signal. In this embodiment, the connection component 30 is a resistor.

When the computer is turned off, the voltage at the power good pin PWR_GOOD of the power connector H drops to a low level from a high level immediately to turn off the first transistor Q1, the collector of the first transistor Q1 is at a high level to turn on the second transistor Q2, and the output terminal PG is at a low level. The logic level of the output signal of the output terminal PG is the same with that of the output signal of the power good pin PWR_GOOD of the power connector H, so it satisfies the ATX power supply standard. In order to prevent the voltage of the power good pin PWR_GOOD of the power connector H dropping to a low level from a high level for a while, and then rebounding to the high level again, which can disrupt timing, the third transistor Q3 and the resistor R3 are added in this embodiment. When the computer is turned off, the voltage of the power supply on pin PS_ON of the power connector jumps to a high level from a low level to turn on the third transistor Q3 via the resistor R3, which makes the output terminal PG at a low level immediately, whether the voltage of the power good pin PWR_GOOD is high or low, the output terminal PG will maintain low level.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An adaptor circuit for a power supply comprising:
   a power connector adapted for coupling to an Advanced Technology Extended (ATX) power supply, the power connector comprising a power good pin and a power pin;
   a first electric switch having a first terminal connected to the power good pin of the power connector, a second terminal connected to the power pin of the power connector via a first resistor, and a grounded third terminal;
   a second electric switch having a first terminal connected to the second terminal of the first electric switch, a second terminal connected to a first voltage terminal via a first transmission line or a second voltage terminal via a second transmission line by selectively mounting a connection component to close an open segment of the corresponding transmission line according to a specification of chipsets on a motherboard, and a grounded third terminal; and
   an output terminal connected to the second terminal of the second electric switch to provide a voltage signal according to the specification of the chipsets to the chipsets on the motherboard as a driving voltage signal.

2. The adaptor circuit as claimed in claim 1, wherein the connection component is a resistor.

3. The adaptor circuit as claimed in claim 1, wherein the first electric switch and the second electric switch are NPN transistors, the first, second, and third terminals are base, collector, and emitter respectively.

4. The adaptor circuit as claimed in claim 1, wherein the power pin of the power connector is a 5V power pin.

5. The adaptor circuit as claimed in claim 1, wherein the first voltage terminal is a 3.3V-SYS terminal of the ATX power supply, and the second voltage terminal is a 5V-SYS terminal of the ATX power supply.

6. The adaptor circuit as claimed in claim 1, wherein the first terminal of the first electric switch is connected to the power good pin via a second resistor.

7. The adaptor circuit as claimed in claim 1, wherein the second terminal of the second electric switch is grounded via a capacitor.

8. The adaptor circuit as claimed in claim 1, further comprising a third electric switch, the power connector further comprising a power supply on pin, the third electric switch having a first terminal connected to the power supply on pin of the power connector, a second terminal connected to the output terminal, and a grounded third terminal.

9. The adaptor circuit as claimed in claim 8, wherein the third electric switch is an NPN transistor, the first, second, and third terminals are the base, the collector, and the emitter of the NPN transistor respectively.

10. The adaptor circuit as claimed in claim 9, wherein the first terminal of the third electric switch is connected to the power supply on pin via a third resistor.

* * * * *